UNITED STATES PATENT OFFICE.

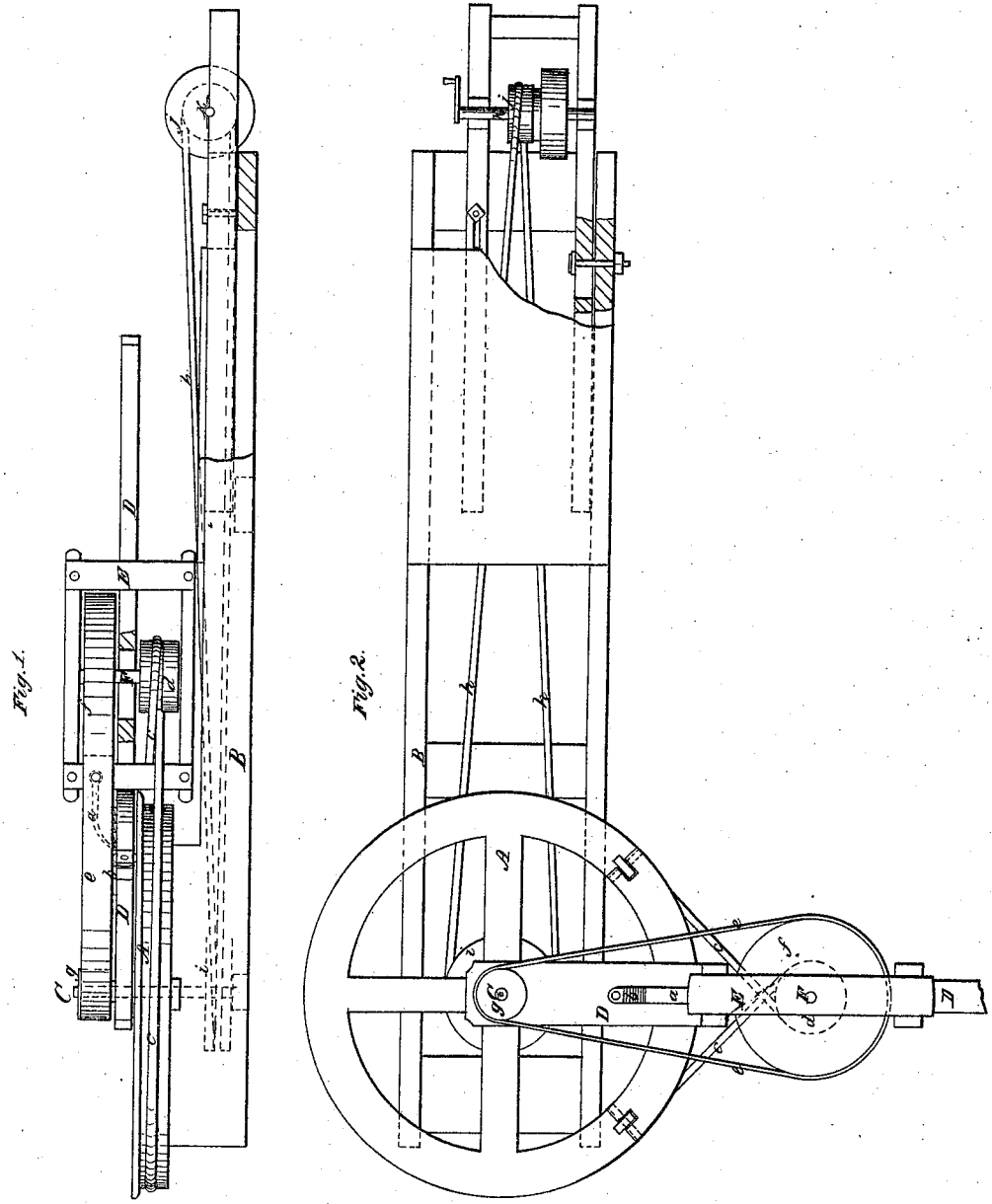

GEORGE LEWIS, OF PANAMA, NEW YORK, ASSIGNOR TO HIMSELF, RALPH HOYT AND C. W. HOYT, OF SAME PLACE.

IMPROVEMENT IN HORSE-POWERS.

Specification forming part of Letters Patent No. 43,738, dated August 2, 1864.

*To all whom it may concern:*

Be it known that I, GEORGE LEWIS, of Panama, in the county of Chautauqua and State of New York, have invented a new and Improved Horse-Power; and I do hereby declare that the following is a full, clear, and exact description thereof, which will enable any person skilled in the art to make and use the same, reference being had to the accompanying drawings, forming a part of this specification, in which—

Figure 1 represents a longitudinal vertical section of my invention. Fig 2 is a plan or top view of the same.

Similar letters of reference in both views indicate corresponding parts.

This invention consists in a revolving frame connected to and adjustable on the sweep, which turns loosely on a vertical shaft passing through the center of the stationary master-wheel, in combination with suitable pulleys and belts, one of which extends round the master-wheel and round a pulley mounted on an arbor which has its bearings in the revolving frame, and which also has another pulley mounted on its upper end, from which a second belt extends to a pulley on the upper end of the central shaft of the master-wheel in such a manner that by shifting the revolving frame toward or from the center the belts which transmit the motion from one shaft to the other can be slackened or tightened, as may be required, and by carrying the movable frame round the master-wheel a rotary motion is imparted to the central shaft, which can be transmitted by suitable belts or pulleys to the working-machines which are to be set in motion by the horse-power.

A represents the master-wheel, which is made of wood or any other suitable material, and which is rigidly attached to the main frame B. Through the center of this wheel passes the vertical shaft C, on which the sweep D turns loosely. The sweep forms the guide for the frame E, which forms the bearings for a secondary shaft, F, and which is adjustable toward and from the center of the master-wheel by a dog, *a*, catching in the toothed rack *b*. Said dog is pivoted to the frame, and the toothed rack is firmly secured to the inner end of the sweep, and the teeth of said rack point outward or from the center of the master-wheel, so that they allow of moving the frame E outward, but prevent it from approaching the center of the master-wheel until the dog is raised. Suitable friction-wheels under the inner end of the sweep and bearing on the upper surface of the master-wheel facilitate the motion of the frame E round the central shaft, C. A belt, *c*, extends from the master-wheel round a pulley, *d*, which is mounted on the shaft E, and another belt, *e*, extends from the pulley *f* on the upper part of the shaft F to a pulley, *g*, which is mounted on the upper end of the central shaft, C, and the motion imparted to this shaft is transmitted to the working-machines by a belt, *h*, extending from a pulley, *i*, at the bottom end of said shaft to a pulley, *j*, which is mounted on a shaft, *k*, and from which the motion is transmitted by another belt to the working-machines. As the sweep, with the frame E, is carried round the master-wheel the belt *c* causes the pulley *d* to rotate and impart motion to the shafts F and C, and through them to the shaft *k* and to the working-machines. If the belts *c* and *e* get slack, they can readily be tightened by moving the frame E farther from the center of the master-wheel, and by this adjustability of said revolving frame the application of new belts is considerably facilitated and the operation of the power is rendered easy and practicable.

I am aware that it is common in horse-powers to rotate the central shaft by a belt connecting it with a secondary shaft journaled in the revolving frame or sweep and driven by a stationary master-wheel.

What I claim as new, and desire to secure by Letters Patent, is—

The adjustable frame E, secured to the revolving sweep D, in combination with the stationary master-wheel A, central shaft, C, and secondary shaft F, all constructed and operating in the manner and for the purpose herein shown and described.

GEORGE LEWIS.

Witnesses:
I. H. PRAY,
W. G. COOK.